United States Patent Office 3,489,707
Patented Jan. 13, 1970

3,489,707
MOLDING COMPOSITIONS CONTAINING UN-
SATURATED AND SATURATED POLYESTERS
RESINS, THERMOPLASTIC POLYMERS, MONO-
MERIC MATERIAL AND FILLER
David Philip Fry, Cardiff, Wales, assignor to BP Chemicals (U.K.) Limited, London, England, a British company
No Drawing. Continuation-in-part of application Ser. No. 430,454, Feb. 4, 1965. This application Mar. 6, 1968, Ser. No. 710,788
Int. Cl. C08f 43/08, 45/38
U.S. Cl. 260—31.6                7 Claims

ABSTRACT OF THE DISCLOSURE

Thermosetting molding compositions based on unsaturated polyester resins containing a saturated liquid polyester and a thermoplastic polymer which is capable of being plasticised by said liquid polyester in order to prevent exudation of the liquid polyester when the molding compositions are set by the action of heat.

---

This application is a continuation in part of my application Ser. No. 430,454, filed Feb. 4, 1965 now abandoned.

The present invention relates to improvements in thermosetting molding compositions. By a thermosetting molding composition is meant throughout this specification a composition containing as an essential component an unsaturated polyester which composition is normally fabricated into hard infusible shaped articles by the action of heat and pressure, for example by pressing in a heated mold, or in a heated die as used in an extrusion process. Such compositions normally contain more than 50% by weight of inert filling or reinforcing material.

Examples of such thermosetting compositions are dough molding compositions, preimpregnated mats or other forms of reinforcement in preimpregnated form, matched die compositions based on unsaturated polyester and reinforcement mat or "preform" i.e. preformed molding compositions. The present invention as described hereafter is particularly useful with respect to dough molding compositions. By a dough molding composition is meant throughout this specification a composition of a dough consistency which can be molded and which contains as essential component an unsaturated polyester and a monomeric material which is copolymerizable therewith, said composition being capable of being thermoset to a hard product under the influence of heat and pressure, but being sufficiently stable for normal storage of at least several hours and preferably for longer periods.

Unsaturated polyesters for use in thermosetting molding compositions e.g. dough molding compositions, are well known. Such a polyester is usually a condensation product of a glycol with a mixture of an α-unsaturated dibasic acid (for example maleic or fumaric acid) and a saturated dibasic acid such as phthalic acid, possibly modified by the presence of a small amount of a polyhydric alcohol (for example pentaerythritol). Examples of suitable copolymerizable monomeric materials are styrene and diallyl phthalate. Such polyesters and suitable monomeric materials are described in British Patents 497,175; 592,046; 540,169 and 656,138. Thermosetting molding compositions usually contain a peroxidic catalyst and an inhibitor such as hydroquinone or tertiary butyl catechol and a proportion of non-reinforcing and reinforcing filler and, if desired, pigments and other conventional additives. The fillers may be glass fibers, finely divided minerals such as calcium carbonate or forms of cellulose including sisal or more usually a mixture of such fillers.

One disadvantage of thermosetting molding compositions is that they tend to crack and shrink particularly when used in the production of articles having relatively thick sections.

An object of the present invention is to provide thermosetting molding compositions having improved properties.

Accordingly the present invention is a thermosetting molding composition containing a saturated liquid polyester, as hereinafter defined, and sufficient thermoplastic polymer, which polymer is capable of being plasticized by said saturated liquid polyester, to prevent deleterious exudation of saturated polyester during the thermosetting of the molding compositions.

The term plasticizer is used throughout this specification in its normal sense according to the nomenclature adopted by the Council of the International Union of Pure and Applied Chemistry on Sept. 15, 1951, i.e. a plasticizer is a substance or material incorporated in a material (usually a plastic or an elastomer) to increase its flexibility, workability, or distensibility.

The thermosetting molding compositions according to the present invention may contain the conventional components which have hitherto been used in the production of such compositions. However in addition they contain one or more saturated liquid polyesters and a minor proportion of the above mentioned thermoplastic polymer. By saturated liquid polyester is meant the group of substances which are known per se mainly as plasticizers for various thermoplastic resins. They are liquid, by which is meant that they have a melting point below 30° C. They are prepared by esterifying a polyhydric alcohol, e.g. a glycol, with a polybasic acid. Typical examples are the polyesters prepared by the interesterification of, for example, propylene glycol with dibasic acids such as adipic acid and sebacic acid.

The liquid saturated polyesters are suitably present in compositions according to the present invention in proportions from 1 to 20% by weight of the total composition. Preferably they are present in the proportion from 3% to 10%.

In the absence of the above mentioned thermoplastic polymer, saturated liquid polyesters tend to exude from thermosetting molding compositions during the hot molding process by which hard products are obtained therefrom. Surprisingly it is found that the presence of relatively small quantities of the thermoplastic polymer, which is capable of being plasticized by the saturated liquid polyester, can prevent this liquid polyester exudation. The minimum amount of thermoplastic polymer necessary to prevent exudation can readily be found by experiment. There is normally no advantage in adding more thermoplastic polymer than this minimum amount although greater amounts e.g. up to about 20% by weight of the total composition can be employed without any disadvantageous results. Often suitable quantities of thermoplastic polymer lie in the range 5% to 200% by weight of the quantity of saturated liquid polyester present. The preferred quantity of thermoplastic polymer is about 25% to 100% by weight of the quantity of saturated liquid polyester present.

The preferred thermoplastic polymers are those solid polymers which, when dispersed in a finely divided state in a mixture of an unsaturated polyester and a liquid copolymerizable monomer, such as for monomeric styrene, are partially soluble or are swelled by the monomer. For example a useful thermoplastic polymer in the practice of this invention is finely divided polyvinyl chloride such as that sold in Great Britain under the trade name of Breon 121 or a copolymer containing a major proportion by weight of polymerized vinyl chloride units in its molecular structure or polystyrene.

The saturated liquid polyester and the thermoplastic polymer can be added to the thermosetting molding composition at any stage in its manufacture. These two essential components can be added separately or together.

The thermosetting molding compositions according to the present invention preferably contain a polymerization initiator to aid the thermosetting of the unsaturated polyester and copolymerizable monomer. Any of the peroxidic initiators which are well known for use with unsaturated polyester resin compositions can be used in compositions according to the present invention.

The preferred unsaturated polyesters for use in the practice of this invention, are those which have a relatively high hot rigidity in the thermoset state, so that any reduction of rigidity due to the presence of the saturated polyester is offset. Examples of such unsaturated polyesters are those in which esterified isophthalic acid residues are present and therefore a preferred embodiment of the invention is a thermosetting molding composition in which the major proportion of the unsaturated polyester present contains esterified isophthalic acid residues.

The following examples illustrate the preparation and properties of compositions according to the present invention. The parts referred to are by weight.

Unsaturated polyester I was prepared from:

| | Molar proportions |
|---|---|
| Propylene glycol | 7.3 |
| Diethylene glycol | 0.5 |
| Phthalic anhydride | 1.0 |
| Isophthalic acid | 1.0 |
| Maleic anhydride | 5.0 | in the usual manner until it had an acid number of 40, and then 200 parts per million of hydroquinone were added. The polyester was then dissolved in monomeric styrene so as to form a 60% by weight solution.

Unsaturated polyester resin II was prepared from:

| | Molar proportions |
|---|---|
| Propylene glycol | 3.3 |
| Diethylene glycol | 0.3 |
| Endo-methylene tetrahydro phthalic acid | 0.9 |
| Maleic anhydride | 2.5 |

These materials were reacted in known manner to give an unsaturated polyester having an acid number of 40 and 100 parts per million of hydroquinone were added. The polyester was then dissolved in monomeric styrene to form a 63% by weight solution.

The dough molding compositions described in the following examples were tested in accordance with British Standard No. 2782, 1958.

EXAMPLE 1

35 parts by weight of the unsaturated polyester I solution described above together with 1 part of benzoyl peroxide paste and 2 parts of internal lubricant were mixed thoroughly with 1.5 parts of finely divided polyvinyl chloride, sold under the trade name of Breon 121 by British Geon Limited, which has a particle size in the range 0.5 to 10 microns, 7.0 parts of polypropylene adipate (a saturated liquid polyester manufactured and sold under the trade name of Hexaplas PPA Imperial Chemical Industries Limited) and 38.2 parts of carbonate filler in a Z Blade mixer. To this paste was added 15 parts of ¼" chopped glass fibers, and the whole mass mixed until all the fibers were dispersed. The polyvinyl chloride is capable of being plasticized by the polypropylene adipate.

Test results obtained on molded specimens formed from the resulting dough molding composition are shown hereunder. No saturated liquid polyester exuded from the molding composition during the thermosetting process. The premolded composition had excellent handling properties.

| | |
|---|---|
| Cross breaking strength, p.s.i. | 15,500 |
| Impact strength, ft.lb./in. notch | 6.1 |
| Tensile strength, p.s.i. | 7,400 |
| Water absorption 1 day, mg. | 25 |
| Shrinkage inches, per inch | 0.0010 |
| Volume resistivity, ohm.cm. | $10^{14.2}$ |
| Surface resistivity (wet), ohm.cm. | $>10^{14.6}$ |
| Breakdown voltage at 90° C., volts/mil | 280 |
| Power factor at 1 mc./s. | 0.030 |
| Permitivity at 1 mc./s. | 4.40 |

The moldings made from this composition were further characterised by showing an outstanding freedom from surface ripple and cracks, internal voids and distortion. A superlative surface gloss was also in evidence.

A dough molding composition similarly formualted, but not containing the polypropylene adipate additive, showed similar physical properties in the molded articles made therefrom, but said molded articles showed a higher mold contraction of 0.0035 inch per inch, considerable surface ripple and hairline cracks, also a less glossy surface and thicker sections revealed extensive internal voiding.

A dough molding composition similarly formulated but containing a thermoplastic additive such as polystyrene in place of the polypropylene adipate, showed many of the advantages exhibited by the composition of Example 1. However the cross breaking strength and impact strength were lower, and the premolded composition was objectionably tough to handle. Furthermore the molded articles made therefrom did not show the excellent surface gloss achieved in articles molded from the composition of Example 1.

EXAMPLE 2

A dough molding composition was made up from the following ingredients:

| | Parts |
|---|---|
| Polypropylene sebacate sold under the trade name Reoplex 100 by Geigy Co. | 3.0 |
| The styrene solution of unsaturated polyester I | 20.0 |
| Additional styrene monomer | 2.0 |
| Catalyst | 1.3 |
| Inhibitor | 0.05 |
| Zinc stearate | 1.45 |
| Mineral fillers, total | 54.2 |
| ¼" chopped glass fibers | 15.0 |
| Polyvinyl chloride sold under the trade name Breon 121 by British Geon Limited | 3.0 |

The polypropylene sebacate is a plasticizer for the polyvinyl chloride.

Test results obtained on molded specimens were as follows:

| | |
|---|---|
| Shrinkage inches, per inch _____expansion__ | +0.00042 |
| Flexural strength, p.s.i. | 15,500 |
| Impact strength, ft. lb/in. notch | 5.0 |
| Tensile strength, p.s.i. | 9,660 |
| Water absorption—1 day, mgms. | 13 |
| Volume resistivity, ohm. cm. | $10^{13.52}$ |
| Surface resistivity, ohm | $>10^{14.57}$ |
| Breakdown voltage at 90° C., volts/mil | 271 |
| Power factor at 1 mc./s. | 0.021 |
| Permitivity at 1 mc./s. | 5.11 |

It should be noted that this dough molding composition has the most valuable property of showing an expansion in the above molding test. A composition which was identical except for the absence of the polypropylene sebacate exhibited shrinkage in this molding test.

EXAMPLE 3

A dough molding composition was made up from the following ingredients:

| | Parts |
|---|---|
| A saturated liquid polyester sold by Rohm & Haas under the trade name Paraplex G25 | 4.0 |
| The styrene solution of unsaturated polyester II | 20.0 |
| Additional styrene monomer | 1.0 |
| Catalyst, benzoyl peroxide | 1.0 |
| Internal lubricants | 1.55 |
| Inhibitor | 0.05 |
| Polyvinyl chloride powder sold under the trade name Breon 121 by British Geon Ltd. | 1.5 |
| Mineral fillers, total | 61.9 |
| ¼" chopped glass fibers | 10.0 |

The paraplex G25 is a plasticizer for the polyvinyl Chloride.

Test results obtained on molded specimens were as follows:
| | |
|---|---|
| Impact strength ft. lbs./in | 4.6 |
| Flexural strength lbs./sq. in | 13,740 |
| Shrinkage inches per inch expansion | 0.00009 |

EXAMPLE 4

A dough molding composition was made up from the following ingredients:

| | Parts |
|---|---|
| The styrene solution of unsaturated Polyester II | 20.0 |
| Polypropylene adipate (Hexaplas PPA) | 4.0 |
| A butadiene/acrylonitrile copolymer manufactured and sold under the trade name Hycar 1001 by British Geon Limited | 1.5 |
| Catalyst (Benzoyl peroxide paste) | 1.0 |
| Lubricants (Zinc and Calcium Stearates) | 1.55 |
| Inhibitor | 0.05 |
| Mineral filler | 61.9 |
| ¼" chopped glass fiber | 10.0 |

The propylene adipate is a plasticizer for the Hycar 1001.

Molded specimens exhibited a small expansion in the shrinkage test and a high gloss finish.

Comparative compositions not containing the saturated liquid polyester exhibited a shrinkage of approximately 3 thousand in the shrinkage test and gave moldings having a rippled surface.

EXAMPLE 5

Example 4 was repeated, replacing the Hycar 1001 with a vinyl chloride/vinyl acetate copolymer manufactured and sold by British Geon Limited under the trade name Breon 425. The polypropylene adipate is a plasticizer for the copolymer.

Test results on molded specimens showed an expansion on the shrinkage test. The molded products had an excellent surface and there was no exudation of saturated liquid polyester on molding.

EXAMPLE 6

A composition was prepared from the following ingredients:

| | Parts |
|---|---|
| The styrene solution of unsaturated polyester I | 45.0 |
| Polypropylene sebacate (Reoplex 100) | 3.0 |
| Polyvinyl chloride (Breon 121) | 3.0 |
| Catalyst (50% benzoyl peroxide paste) | 2.0 |
| Lubricants (zinc & calcium stearates) | 2.0 |
| Inhibitor | 0.1 |
| Mineral filler | 44.9 |

This composition was used to impregnate 33 parts of a chopped strand glass mat.

Moldings formed from this impregnated mat showed excellent high gloss finish and exhibited an expansion in the shrinkage test. This example was repeated using increased quantities of polyvinyl chloride (Breon 121) up to 6.0 parts. The moldings formed from these compositions continued to show similar excellent physical properties. By way of comparison a mat impregnated with a similar composition which did not however contain any polypropylene sebacate exhibited shrinkage and gave molded products having an inferior surface finish.

EXAMPLE 7

20 parts by weight of the unsaturated polyester I solution with 1 part of additional styrene monomer, together with 1 part of benzoyl peroxide paste and 1.7 parts of internal lubricant were mixed thoroughly with 2.0 parts of finely ground chlorinated polyphenyl, sold under the trade name of Arochlor 4465 by Monsanto Chemicals Ltd., 4 parts of polypropylene adipate (Hexaplas PPA) and 55.3 parts of mineral filler. To this paste was added 15 parts of ¼" chopped glass fibers, and the whole mass mixed until all the fibers were dispersed.

On molding, no saturated liquid polyester exuded from the molded composition during the thermosetting process. Cured moldings were characterised by an outstanding freedom from surface ripple and cracks, internal voids and distortion. A superlative surface gloss was also in evidence. Molded specimens tested under BS 2782 (1965) 106A shrinkage test showed an expansion.

EXAMPLE 8

20 parts by weight of the unsaturated polyester I solution with 1 part of additional styrene monomer, together with 1 part of benzoyl peroxide paste and 1.6 parts of internal lubricant, were mixed thoroughly with 1.5 parts of polyvinyl acetal, finely ground, sold under the trade name of Mowitol B60H by Hoechst AG, 4 parts of polypropylene adipate (Hexaplas PPA) and 55.9 parts of mineral filler. To this paste was added 15 parts of ¼" chopped glass fibers, and the whole mass mixed until all the fibers were dispersed.

On molding no saturated liquid polyester exuded from the molded composition during the thermosetting process. Cured moldings were characterised by an outstanding freedom from surface ripple and cracks, internal voids and distortion. A superlative surface gloss was also in evidence. Molded specimens tested under BS.2782 (1965) 106A shrinkage test showed an expansion.

EXAMPLE 9

20 parts by weight of the unsaturated polyester I solution, together with 1 part of benzoyl peroxide paste and 1.7 parts of internal lubricant, were mixed thoroughly with 6 parts of acrylonitrile/butadiene/styrene terpolymer, finely divided, sold under the trade name of Abstrene 413 by British Geon Limited, 4 parts of polypropylene adipate (Hexaplas PPA) and 52.3 parts of mineral filler. To this paste was added 15 parts of ¼" chopped glass fiber, and the whole mass mixed until all the fibers were dispersed.

Molded products exhibited outstanding freedom from surface ripple and distortion. No exudation or liquid saturated polyester took place on molding.

Tests results obtained on molded specimens formed from this dough molding composition are shown hereunder.

| | |
|---|---|
| Cross breaking strength, p.s.i. | 10,460 |
| Impact strength, ft.lb./in. notch | 3.43 |
| Water absorption 1 day, m.g. | 20 |
| Shrinkage inches per inch | +2.36 (expansion) |

EXAMPLE 10

A composition was prepared from the following constituents:

| | |
|---|---|
| The styrene solution of unsaturated polyester I | 35.0 |
| Polypropylene adipate (Hexaplas PPA) | 4.0 |
| Polyvinyl chloride (Breon 121) | 2.5 |
| Catalyst (65% benzoyl peroxide paste) | 1.6 |
| Lubricants, (stearine, zinc and calcium stearates) | 1.8 |
| Inhibitor | 0.1 |
| Mineral filler | 51.0 |
| Magnesium oxide | 1.0 |
| Styrene monomer | 3.0 |

This composition was used to impregnate two layers of chopped strand glass mat to a glass content of 25% by weight. After standing for 10 days the mat produced molding which exhibited excellent surface gloss and showed an expansion on the shrinkage test. No reduction in mechanical properties was noted.

| | |
|---|---|
| Flexural strength _____p.s.i__ | 24,400 |
| Tensile strength _____p.s.i__ | 13,700 |
| Izod impact strength _____ft.lb./inch notch__ | 8.3 |
| Contraction _____inches per inch__ | $+0.74 + 10^{-3}$ |

EXAMPLE 11

A composition was prepared from the following constituents:

| | Parts |
|---|---|
| The styrene solution of unsaturated polyester I | 100 |
| Polypropylene adipate (PPA) | 20 |
| Polyvinyl chloride (Breon 121) | 15 |
| Calcium carbonate (precipitated) | 20 |
| Benzoyl peroxide paste (65% in dimethyl phthalate) | 3 |
| Lubricants (zinc stearate) | 2 |

The composition was used to impregnate 3 layers of 1 oz. M8600 continuous filament glass mat.

The resulting molding exhibited exceptional surface gloss and was noticeably free from surface ripple and cracks and was also free from distortion.

EXAMPLE 12

20 parts by weight of the unsaturated polyester I solution, together with 1 part of benzoyl peroxide paste and 1.7 parts of internal lubricant were mixed thoroughly in a Z blade mixer with 10 parts of finely divided polystyrene, 20 parts of polypropylene adipate (Hexaplas PPA) and 32.3 parts of mineral filler. To this paste was added 15 parts of ¼″ chopped glass fibers, and the whole mass mixed until all the fibers were dispersed.

On molding, no saturated liquid polyester exuded from the molded composition during the thermosetting process. Cured moldings, in spite of their poor hot strength due to such a high level of plasticizer, exhibited outstanding freedom from surface ripple and distortion. Molded specimens tested under BS.2782 (1965) 106A shrinkage test showed an expansion.

To illustrate that the polystyrene is plasticized by the Hexaplas PPA, 35 grams of the latter were mixed with 1000 grams of the polystyrene. The mixture was extruded twice. As a control experiment, the polystyrene was extruded twice without an additive.

The melt flow index of the two compositions was determined according to B.S. 2782, Method 105C, using load C, jet A and a temperature of 200° C.

| Melt flow index, grams/10 minutes | |
|---|---|
| Polystyrene + Hexaplas PPA | 9.4 |
| Polystyrene alone | 5.6 |

The Hexaplas PPA is therefore a plasticizer for the polystyrene.

I claim:

1. A fiber-reinforced thermosetting dough molding composition capable of forming smooth-finished articles comprising (a) an unsaturated polyester which is a condensation product of a mixture of reactants comprising a glycol and an α-unsaturated dicarboxylic acid, (b) a monomeric material which is copolymerizable with (a), (c), a saturated polyester which is the condensation product of a polyhydric alcohol with a polybasic acid and which has a melting point below 30° C., (d) a minor proportion by weight of a thermoplastic polymer which is capable of being plasticized by said saturated polyester in order to prevent deleterious exudation of said saturated polyester during the thermosetting of the dough molding composition and (e) a sufficient quantity of an inert filler material to produce a doughy consistency in said composition, component (c) being present in a quantity amounting to 1 to 20% by weight of the composition and component (d) being present in a quantity amounting to at least 5% by weight of the saturated polyester up to 20% by weight of the composition.

2. A composition as claimed in claim 1 wherein the saturated polyester is obtained by the inter-esterification of propylene glycol and a dibasic acid selected from the group consisting of adipic and sebacic acids.

3. A composition as claimed in claim 1 wherein the saturated polyester is present in proportions of 3 to 10% by weight of the total composition.

4. A composition as claimed in claim 1 wherein the quantity of thermoplastic polymer present is about 5 to 200% by weight of the quantity of saturated polyester.

5. A composition as claimed in claim 1 wherein the thermoplastic polymer is a polymer selected from a group consisting of polyvinyl chloride, copolymers of vinyl chloride containing a major proportion by weight of polymerised vinyl chloride units, and polystyrene.

6. A composition as claimed in claim 1 wherein the major proportion of the unsaturated polyester present contains esterified isophthalic acid residues.

7. The composition according to claim 1 wherein said component (e) is present in the amount of at least 50% by weight of the composition.

References Cited

UNITED STATES PATENTS

| | | | |
|---|---|---|---|
| 2,567,719 | 9/1951 | Loritsch et al. | 260—862 |
| 2,617,779 | 11/1952 | Griffith et al. | 260—31.6 |
| 2,856,378 | 10/1958 | Lundberg | 260—860 |
| 3,227,665 | 1/1966 | Fourcade et al. | 260—873 |
| 3,291,636 | 12/1966 | Reighter et al. | 260—862 |

FOREIGN PATENTS

| | | |
|---|---|---|
| 560,003 | 7/1958 | Canada. |

OTHER REFERENCES

Bjorksten: Polyesters and Their Applications; Reinhold Publishing Corp.; 1956; pp. 163 and 165.

Buttrey: Plasticizers; 2nd ed.; Cleaver-Hume Press Ltd.; 1957; pp. 151 and 153.

MORRIS LIEBMAN, Primary Examiner

L. T. JACOBS, Assistant Examiner

U.S. Cl. X.R.

260—40, 862, 873

PO-1050
(5/69)

UNITED STATES PATENT OFFICE
CERTIFICATE OF CORRECTION

Patent No. 3,489,707      Dated January 13, 1970

Inventor(s) DAVID PHILIP FRY

It is certified that error appears in the above-identified patent and that said Letters Patent are hereby corrected as shown below:

In the heading after "Ser. No. 710,788", insert

-- claims priority, application Great Britain,

February 19, 1964, 6850/64 --.

SIGNED AND
SEALED
MAY 12 1970

(SEAL)
Attest:

Edward M. Fletcher, Jr.
Attesting Officer

WILLIAM E. SCHUYLER, JR
Commissioner of Patents